UNITED STATES PATENT OFFICE.

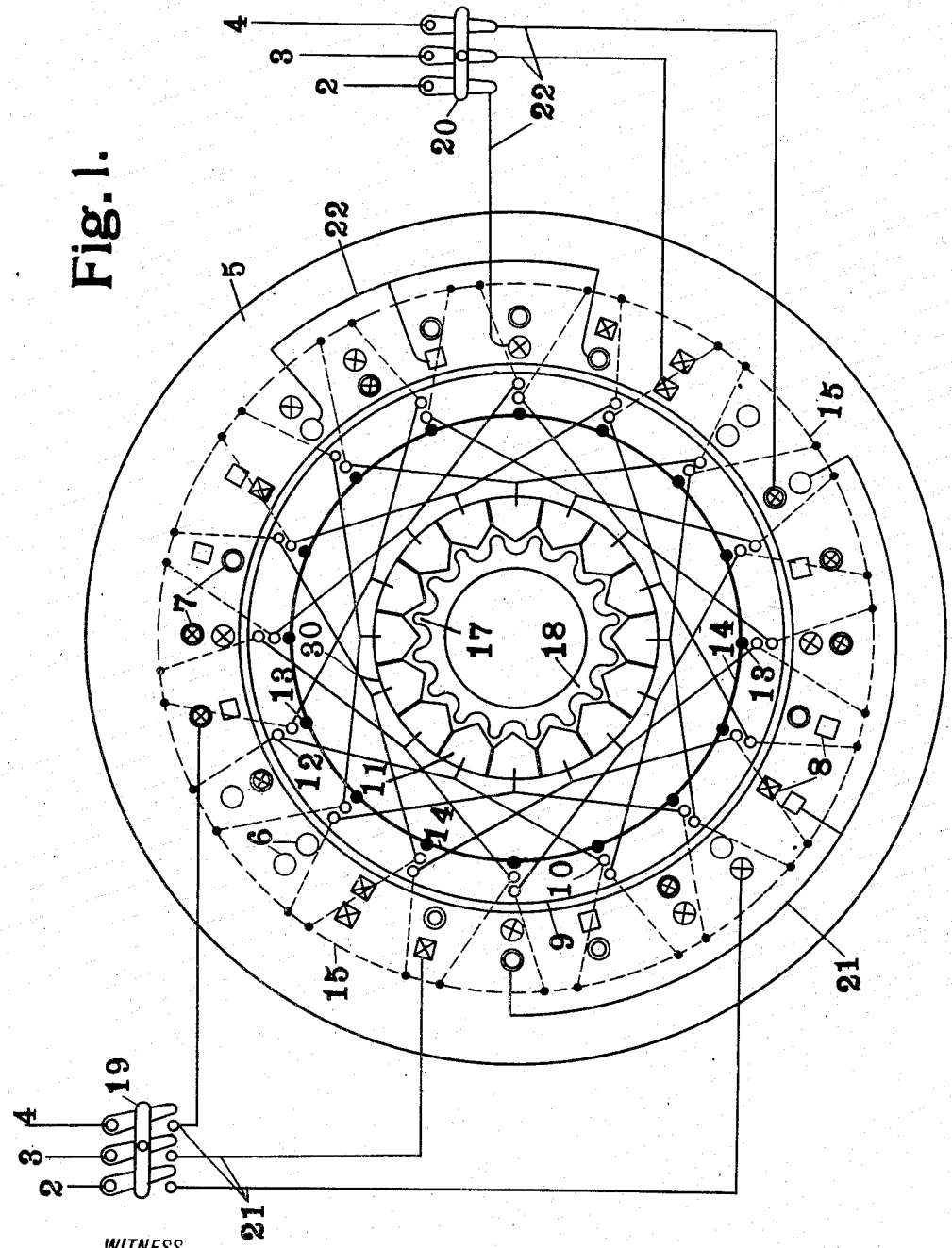

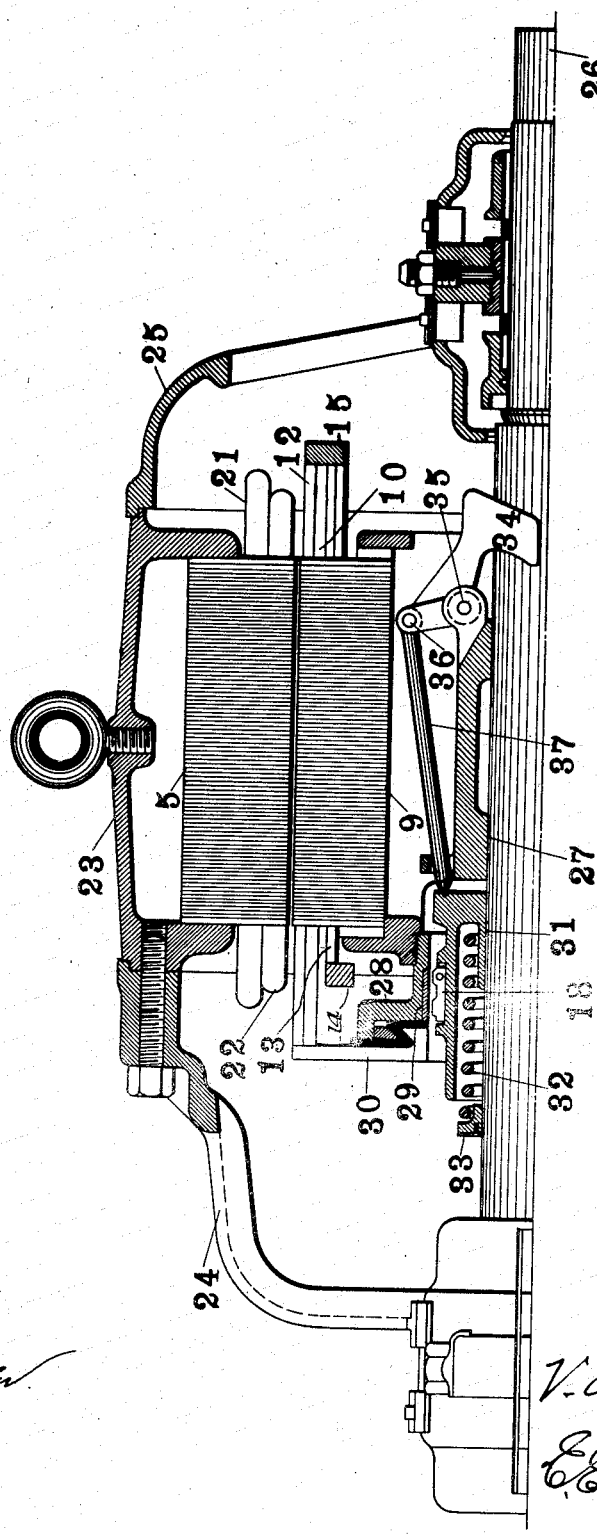

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,213,618. Specification of Letters Patent. Patented Jan. 23, 1917.

Application filed April 12, 1915. Serial No. 20,717.

*To all whom it may concern:*

Be it known that I, VALÈRE ALFRED FYNN, a subject of the King of England, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates more particularly to polyphase asynchronous induction motors having a shunt characteristic and capable of being operated at a plurality of speeds, the several speeds being obtained either by providing the stator with a plurality of polyphase windings each producing a different number of poles or by so arranging one polyphase winding on the stator that its connections can be reorganized to produce different numbers of stator poles.

My objects are to produce a machine of this type which will start with a powerful torque, operate at one or more speeds while making full use of the rotor copper, and yet be of simple, efficient and cheap construction.

In carrying out my invention, I make use of a rotor carrying a permanently short-circuited winding of high resistance and preferably of the squirrel cage type, and of a pole winding of low resistance. By "pole winding" I refer to a winding which is composed of a number of coils having at least one turn and a pitch of the same order of magnitude as a stator pole pitch. In this case each of the elements of said pole winding consists of one permanently short-circuited turn. These elements are all interconnected at one end and are each connected to a segment of a contacting device, preferably in the shape of a commutator, at the other end. I so dimension the squirrel cage winding that the latter will enable the motor to start with a powerful torque in coöperation with one number of stator poles, and I choose the step of the pole winding in such a manner that it will not be inductively responsive to the stator magnetization produced at starting. I further provide a device for short-circuiting all the segments of the contacting device to which the rotor pole winding is connected, and by operating this short-circuiting device, I convert the rotor pole winding into a squirrel cage winding, thus rendering the same inductively responsive to any number of stator poles or to any kind of stator magnetization. I generally prefer to so set the short-circuiting device that it will operate just before the motor reaches the lowest speed for which it is designed.

My invention will be better understood by reference to the accompanying drawings in which—

Figure 1 diagrammatically indicates the stator and rotor windings, while Fig. 2 outlines a possible construction of the machine and, particularly, of the short-circuiting device only diagrammatically indicated in Fig. 1.

Referring more particularly to Fig. 1, 5 is a stator provided with two superposed sets of twenty-four conductors each, preferably located in holes or slots in the laminations, as is usual. The inner set of conductors is connected to produce a three-phase 8-pole winding 22, and can be connected or disconnected from the mains 2, 3, 4, by means of the switch 20. The outer group of twenty-four conductors is connected to produce a three-phase 4-pole winding 21 which may be connected or disconnected from the mains 2, 3, 4, by means of the switch 19. It will be understood that, in practice, a single three-pole two-way switch or controller will be used for reorganizing the stator connections. The conductors, such as 6, forming part of one phase are indicated by single circles, those belonging to the second phase by double circles, such as 7, and those belonging to the third phase by squares, such as 8. A downward direction of current through the plane of the drawing is indicated in every case by a cross, it being assumed that the current in the remaining conductors is directed from back to front of the paper plane, or upward. The manner in which three-phase windings are connected being well understood, not all of the connections have been shown, only those being indicated which go to the first and last conductors of each phase. Both groups of twenty-four conductors are connected in star. Coöperating with this stator, which is provided with a 4-pole and an 8-pole three-phase winding, as described, is a rotor 9 carrying three conductors in each of its 16 slots. Sixteen of these conductors are distinguished by full circles, such as 13, and are interconnected at each end by short-circuiting rings 14 to form the high resistance squirrel cage used at starting. The other thirty-two conductors are each connected to a short-circuiting ring 15 at one end, while at the other they are permanently interconnected in pairs, and each pair is connected to a segment, such as 11, forming part of a commutator-like device 30 adapted to coöperate with a short-circuiting device 18 which is provided with projections 17 adapted to contact with the segments 11.

Two conductors, such as 10 and 12, connected at one end to the short-circuiting ring 15 and at the other to the segment 11, form one element of a permanently short-circuited one-turn rotor pole winding. The step or pitch of each of these elements is so chosen that it will not be inductively responsive to the stator magnetization produced at starting. As shown in Fig. 1, the switch 20 is closed at starting and the 8-pole stator winding is in circuit. The step of the rotor pole winding has, consequently, been chosen so as to be equal to the 4-pole stator pitch. A small movement of the short-circuiting device 18 will short-circuit all the segments of the commutator 13 and thus convert the rotor pole winding into a squirrel cage for each conductor will then be connected to a continuous short-circuiting ring at each end of the rotor. After this rotor pole winding has been so short-circuited, it might also be described as two squirrel cages, the conductors located in the top layer of the rotor winding forming the one, and those of the middle layer the other squirrel cage.

The short-circuiting device with which the system of rotor windings coöperates may be such as illustrated in Fig. 2. The shaft 26 carries the rotor 9 and is supported in bearings attached to the end plates 24, 25, centered on a frame 23 supporting the stator laminations 5, within which are embedded the stator windings 21, 22. The commutator 30 is held in a casting 28 attached to the spider 27 keyed to the shaft and supporting the rotor laminations 9. This casting 28 carries an annular conducting sleeve 29 bored out to the same inner diameter as the commutator 30 but normally insulated from the latter. A sleeve 31, capable of longitudinal motion along the shaft 26, carries a large number of loosely mounted short-circuiting elements 18 located in a groove provided in said sleeve and normally so positioned that they can only make contact with the conductive sleeve 29 but not with the commutator 30. This sleeve and the short-circuiting elements 18 are held in this position by means of a coil spring 32 resting against a nut 33 screwed and locked on the shaft 26, and by means of which the tension of the spring 32 can be adjusted. This sleeve 31 and the short-circuiting elements 18 are also under the control of weights 34 hinged on a pin 35 attached to the spider 27, the movement of said weights being transmitted to the sleeve 31 my means of rods 37 loosely connected to the weights 34 by means of pins 36.

Referring to the operation of the short-circuiting device shown in Fig. 2: As long as the spring 32 is in control of the sleeve 31, the relative position of the inner face of the commutator 30, the inner face of the conducting sleeve 29 insulated from that commutator, and of the short-circuiting elements 18, is as shown in the figure. But, as soon as the rotor has reached a sufficient speed, the weights 34 are thrown outward, away from the center of the shaft, by centrifugal force, they pivot on the pins 35, and force the rods 37 from right to left in a direction opposed to the pressure exerted by the spring 32. As soon as this spring is overpowered, the sleeve 31 and, with it, the short-circuiting elements 18, move to the left and into such a position as to make electrical connection between the inner face of the commutator and the inner face of the conducting tube 29, good contact between the short-circuiting elements 18, the tube and the inner face of the commutator being, in part, secured by centrifugal force which tends to throw the elements 18 out of the groove in the sleeve 31 in which they are located and presses them hard against the inner commutator face and the tube 29, thus totally short-circuiting all of the commutator segments and, therefore, converting the rotor pole winding into what may be described as two squirrel cages.

The preferred mode of operation of this machine as a whole is as follows: The spring 32 and the weights 34 are so adjusted that the commutator 30 will be totally short-circuited in the manner above described just before the machine reaches the lowest speed for which it is designed, in this case, that corresponding to the 8-pole polyphase stator winding. When it is desired to start this motor, switch 19 is left open and switch 20 is closed, as indicated in Fig. 1. The 8-pole stator winding coöperating with the high resistance squirrel cage winding 13, 14, causes the machine to start with a powerful torque, in a manner well understood, and without any interference from the rotor pole winding, because the latter is not inductively responsive to an 8-pole stator magnetization. As soon as the rotor speed reaches the neighborhood of the synchronous for the 8-pole stator magnetization, the short-circuiting device will operate to convert the second rotor winding into a squirrel cage and thus render it inductively responsive to the prevailing stator magnetization, or, for that matter, to any stator magnetization which may be produced. If the higher speed corresponding to the 4-pole magnetization is desired, then it will be necessary to open switch 20 and close switch 19, when the machine will run up to the higher speed with the help of both rotor windings. As soon as the rotor pole winding has been transformed into a squirrel cage or its equivalent, the rotor resistance is, of course, very much reduced and the efficiency of the machine greatly increased. When it is desired to drop from the higher to the lower speed, it is convenient to interrupt the stator circuits at the switch 19, for a time sufficient to allow the speed to reach the neighborhood of the synchronous corresponding to the higher number of poles, and then to close the switch 20, thus producing 8 instead of 4 poles in the stator.

When each element of the rotor winding which is connected to the commutator-like contacting device is composed of two conductors joined to form a permanently closed coil so disposed as not to be inductively responsive to the stator magnetization produced at starting, then the short-circuiting device is, under certain circumstances, relieved of much of the current it would otherwise have to carry. In the example shown in Fig. 1, for instance, this short-circuiting device will carry practically no current at all when the stator is connected to produce four poles, and it will carry practically all of the current which circulates in the rotor pole winding when the stator magnetization is an eight pole one. If the machine were so arranged that a six pole magnetization could also be produced by the stator, then, at the corresponding intermediate speed, the rotor short-circuiting device would carry part of the short circuit currents circulating in the rotor pole winding, and the other part of said currents would close through the elements of said winding, without passing the short-circuiting device. If the second rotor winding were composed of elements comprising only one conductor each connected to the short-circuiting ring 15 at one end and to a segment of a commutator at the other, then the short-circuiting device would have to carry all the current in that winding for every stator pole combination.

For the sake of a clear illustration of my invention, I have shown only twenty-four stator and sixteen rotor slots. It is obvious that, in practice, the number of slots in both members should, as a rule, be considerably larger. It is also well understood that the stator may be provided with a single winding for each phase so arranged as to be capable of successively producing different numbers of poles by reorganizing the connections of its elements.

While I have illustrated my invention as applied to a stator capable of producing two sets of poles, namely, four and eight, yet it is by no means restricted to such a combination and is indeed particularly suited to a motor, the stator of which is adapted to produce more than two sets of poles.

The ring 15 may be used to interconnect the squirrel cage conductors 13 in addition to interconnecting the conductors of the pole winding, as shown in Fig. 2.

Although my invention has been described in connection with a polyphase motor, it can, of course, be applied to machines operated from a single-phase source by providing the stator with single-phase windings and starting the machine in any known and convenient manner, for instance, as a split-phase machine.

Having fully described my invention, what I claim as new and desire to secure by Letters-Patent of the United States is:

1. In an alternating current motor, the combination of means for successively producing different numbers of stator poles, a rotor provided with a pole winding and a winding inductively responsive to any number of available stator poles, and means for rendering the rotor pole winding inductively responsive to any available number of stator poles when a speed has been attained approximating the synchronous speed for one of the available number of stator poles.

2. In an alternating current motor, the combination of means for successively producing different numbers of stator poles, a rotor provided with a pole winding and a squirrel cage winding, and means for converting the rotor pole winding into a squirrel cage winding when a speed has been attained approximating the synchronous speed for the largest number of stator poles.

3. In an alternating current motor, the combination of means for successively producing different numbers of stator poles, a rotor provided with a permanently short-circuited pole winding of low resistance and a squirrel cage winding of higher resistance, and means for converting the rotor pole winding into a squirrel cage winding when a speed has been attained approximating the synchronous speed for the largest number of stator poles.

4. In an alternating current motor, the combination of means for successively producing different numbers of stator poles, a rotor provided with a pole winding and with another winding, the elements of said pole winding consisting of permanently short-circuited coils all interconnected at one end and means for connecting the other ends of said coils after the motor has started.

5. In a dynamo electric machine, a rotor provided with a pole winding, the elements of which consist of permanently short-circuited coils all interconnected at one end, and means for interconnecting the other ends of said coils.

6. In a dynamo electric machine, a rotor provided with a squirrel cage winding and a pole winding, the elements of said pole winding consisting of permanently short-circuited coils all interconnected at one end, and means for interconnecting the other ends of said coils.

7. In a dynamo electric machine, a rotor provided with a squirrel cage winding and a pole winding, and means for converting the pole winding into a squirrel cage winding after the motor has started.

8. In a dynamo electric machine, a rotor provided with a high resistance squirrel cage winding and a permanently short-circuited pole winding, a short-circuiting ring connected at one end of the rotor to the pole winding, a series of contact members at the other end of the rotor to one of which each element of the rotor pole winding is connected, and means for interconnecting the said contact members.

9. The method of operating an alternating current motor provided with means for successively producing different numbers of stator poles, a rotor winding inductively responsive to any available number of stator poles and a pole winding on the rotor, which comprises producing at starting a stator magnetization to which the rotor pole winding is not inductively responsive and rendering said winding inductively responsive to any available number of stator poles when a speed approximating the synchronous for the highest number of stator poles is attained.

10. The method of operating an alternating current motor provided with means for successively producing different numbers of stator poles, a squirrel cage rotor winding and a permanently short-circuited pole winding, which comprises producing at starting a magnetization to which the rotor pole winding is not inductively responsive and converting said winding into a squirrel cage winding when a speed approximating the synchronous for the highest number of stator poles is attained.

In testimony whereof, I have hereunto set my hand and affixed my seal in the presence of the two subscribing witnesses.

VALÈRE ALFRED FYNN. [L. S.]

Witnesses:
W. A. ALEXANDER,
G. M. SHORE.